Oct. 7, 1958 S. TRIBALAT 2,855,294
METHOD OF EXTRACTING STRONG ACIDS IN AN AQUEOUS MEDIUM
Filed June 9, 1954 2 Sheets-Sheet 1

INVENTOR
SUZANNE TRIBALAT
BY
ATTORNEYS

United States Patent Office 2,855,294
Patented Oct. 7, 1958

2,855,294

METHOD OF EXTRACTING STRONG ACIDS IN AN AQUEOUS MEDIUM

Suzanne Tribalat, Paris, France, assignor to Centre National de la Recherche Scientifique, Paris, France, a corporation of France Application June 9, 1954, Serial No. 435,571

Claims priority, application France June 18, 1953

14 Claims. (Cl. 75—121)

This invention relates to a method of purification and extraction of strong acids in an aqueous medium by use of immiscible solvents.

It is known that certain mineral or organic compounds dissolved in a liquid phase can be separated through exhaustion of the latter by means of suitable immiscible solvents. While conducting tests bearing on this problem, the extraction of mineral and organic acids from their aqueous solutions by means of various organic solvents was studied.

When equilibrium of a given substance between two liquid immiscible phases is achieved, the extraction coefficient is determined by the relative concentrations of the substance in both phases at equilibrium. I have made a systematic study of the variations of this extraction coefficient, designated by F, for different systems, and under different operating conditions.

Figure 1:
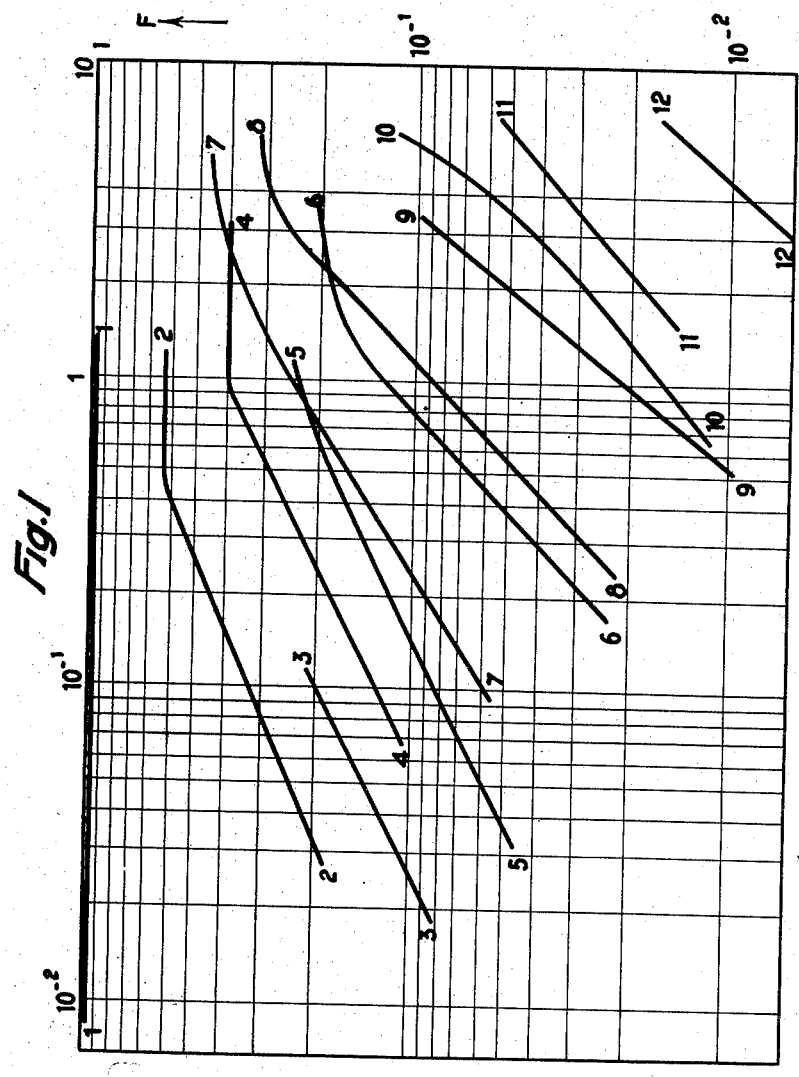

The extraction of pure acids from an aqueous solution by use of different solvents was investigated; the results from these tests are transcribed on a bilogarithmic scale on the curves of Fig. 1 where the extraction coefficient, F, is given as the ordinate, and the concentration of the aqueous phase before extraction in normality per liter as the abscissa.

The curves show the extraction of:

Curve 1—acetic acid through isoamyl alcohol
Curve 2—perrhenic acid through isoamyl alcohol
Curve 3—perrhenic acid through benzyl alcohol
Curve 4—perchloric acid through isoamyl alcohol
Curve 5—perchloric acid through benzyl alcohol
Curve 6—perchloric acid through octyl alcohol
Curve 7—nitric acid through isoamyl alcohol
Curve 8—hydrochloric acid through isoamyl alcohol
Curve 9—hydrochloric acid through octyl alcohol
Curve 10—sulphuric acid through isoamyl alcohol
Curve 11—sulphuric acid through benzyl alcohol
Curve 12—sulphuric acid through octyl alcohol In a general manner, it can be noted that when the studied acid is not a weak acid, in water, like acetic acid, the extraction coefficient F increases regularly with the concentration of the solution, and tends toward a constant value in a concentrated medium. It can also be observed that the value of F nevertheless remains always low (less than 1) in the cases studied.

In a second series of tests, the extraction coefficient was studied by proceeding with the extraction of one of the above compounds in the presence of an excess of hydrogen ions brought about by an acid. The corresponding results were plotted on the diagrams of Fig. 2 where the concentration in the aqueous phase after extraction of the acid generating the excess of hydrogen ions is shown as the abscissae in normality per liter, and the extraction coefficient F of the material extracted is shown as the ordinate. In this figure the different curves respectively correspond to the following operations:

Cure 13—perrhenic acid+sulphuric acid in excess+isobutyl alcohol
Curve 14—perrhenic acid+sulphuric acid+isoamyl alcohol
Curve 15—perrhenic acid+hydrochloric acid+isoamyl alcohol
Curve 16—perrhenic acid+perchloric acid+isoamyl alcohol
Curve 17—perrhenic acid+sulphuric acid+benzyl alcohol
Curve 18—perrhenic acid+sulphuric acid+octyl alcohol
Curve 19—perchloric acid+sulphuric acid+isoamyl alcohol When comparing these results with those of Fig. 1, its is seen that the presence of an excess of hydrogen ions produces a big increase in the extraction coefficient.

In the particular case of perrhenic acid extracted through isoamyl alcohol in the presence of perchloric, hydrochloric and sulphuric acids (curves 14, 15, 16), it is seen that the coefficient of perrhenic acid extraction tends, in a concentrated medium, towards a limit depending on the nature of the acid in excess. In the case of sulphuric acid (curve 14) the limit, not shown on the diagram, is of about 40.

Figure 2:
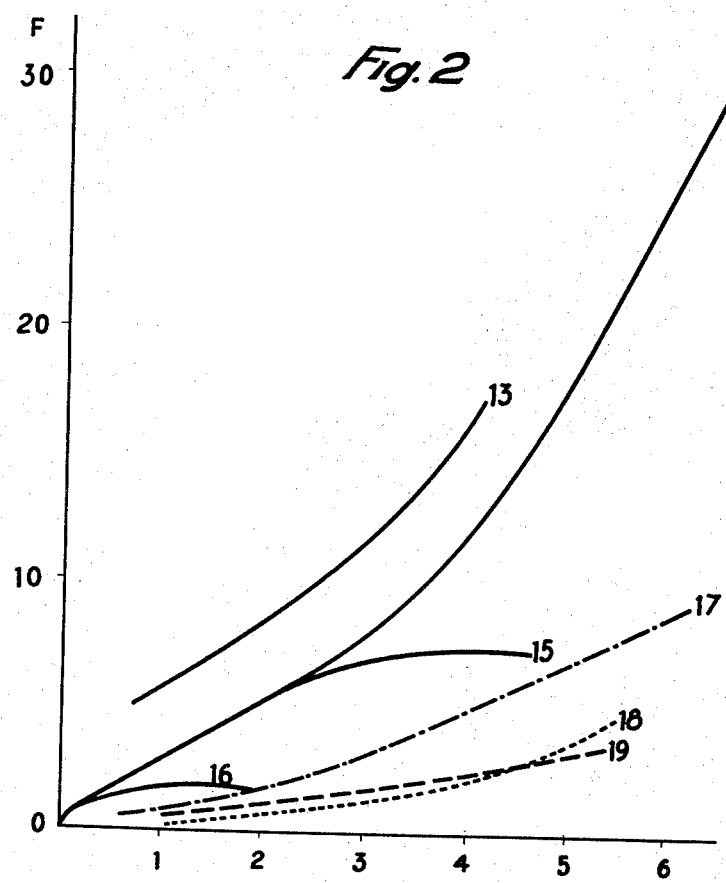

Experience has proved that all these curves of Fig. 2 are independent of the concentration of the material to be extracted as long as the hydrogen ions are in excess with respect to said material.

The curves do not depend on the nature of the cation originally bound to the anion to be extracted: for example, in the case of rhenium the extraction can be made from perrhenic acid or sodium perrhenate, or from any other salt in solution; the results will not vary.

On the other hand, the results are improved as the dielectric constant of the solvent is increased.

Figure 3:
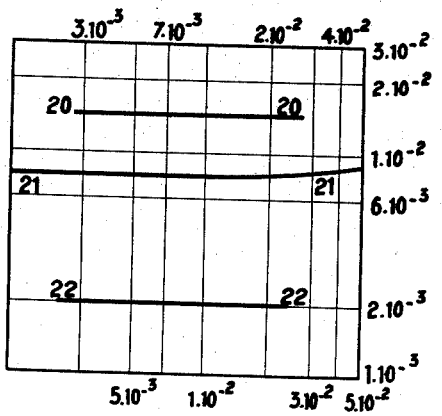

Finally the extraction of pure neutral salts was attempted. The results obtained are indicated on the curves of Fig. 3, where it can be seen that the extraction of a neutral salt through an organic solvent is very low, and that the extraction coefficient remains fairly constant whatever the concentration may be:

Curve 20—extraction of potassium perrhenate through isoamyl alcohol
Curve 21—extraction of sodium perrhenate through isoamyl alcohol
Curve 22—extraction of ammonium perrhenate through isoamyl alcohol Starting from the above outlined results, I have developed a method of extraction and purification of strong acids from aqueous solutions through continuous or discontinuous extraction of the aqueous phase by means of organic solvents. According to my invention, this method consists in adding to the aqueous solution containing the acid to be extracted an excess of hydrogen ions, for example in the form of an acid, in isolating the extracted compound from the solvent phase, and in finally recovering solvent and the acid generating the hydrogen ions.

In a general manner, this method can be followed in apparatus commonly used for the extraction of substances through exhaustion of the aqueous phase by means of organic solvents and in apparatus used for isolating the extracted compound from the solvent phase. Additionally, apparatus for generating the solvent and the acid generating the hydrogen ions is utilized. Since the extraction coefficient obtained by the method of the invention is very high, quantitative exhaustion of aqueous solutions is achieved very quickly at lower costs and with less expensive equipment as compared with known methods.

In carrying the process into effect, the solvent phase can be formed with aliphatic or cyclic alcohols or aliphatic esters, either alone or in mixtures, such as for example: butanols, pentanols, octanol, benzyl alcohol, ethyl, butyl and amyl acetates. Commercial products containing one or the other of said products can also be used, and, finally, aldehydes and ketones immiscible in water, such as methylisobutylketone can be used.

As a hydrogen ion generator, mineral or organic acids which are strongly ionized can be used separate or in mixtures especially perrhenic, hydrochloric, perchloric, nitric, sulphuric, thiocyanic, trichloroacetic and picric acids.

The present method is adapted to the extraction of numerous compounds. In particular can be mentioned the extraction of rhenium and its derivatives with separation from their impurities, regardless of the concentration or source of the rhenium derivatives.

Nowadays, the principal source of rhenium is from the natural sulphides of molybdenum or molybdenites and notably of the American ores which can contain more than 0.02% of rhenium. For extracting rhenium according to known methods, the molybdenites are first roasted in order to produce the molybdic oxide $MoO_3$; the gaseous compounds resulting from this operation entrain the rhenium oxidized to the state of sublimable oxide $Re^2O^7$. This oxide is caught. The concentrates obtained, either solid or liquid, contain molybdenum which was entrained with rhenium, sulphuric acid and, possibly, impurities. The extraction of rhenium from said concentrates of rhenium resulting from the roasting of molybdenites generally takes place according to standard technics by the precipitation of potassium perrhenate which is then purified through multiple fractional crystallizations.

In the present invention, extraction of rhenium from molybdenites is achieved in the following successive operations either in continuous or discontinuous operations.

(a) The mixture in aqueous solution containing the rhenium derivatives is oxidized to the perrhenic state by means of oxidizing agents, regardless of the cations present.

(b) To the aqueous solution is added an excess of hydrogen ions possibly brought about by a strong acid other than perrhenic acid.

(c) The aqueous solution containing the oxidized rhenium derivative and an excess of hydrogen ions is methodically exhausted by a solvent phase.

(d) The solvent phase containing the oxidized rhenium derivative is methodically exhausted by water or an alkaline solution or a slightly acid solution.

The solution resulting from above operation (d) is then treated according to the usual methods in order to isolate the rhenium derivative (which can be further purified in case of need) and finally elemental rhenium is obtained in the pure state.

According to this method, almost the entire amount of rhenium present in the solution can be recovered in a very high degree of purity without the necessity of carrying out a great number of fractional crystallizations for purification.

The process may, moreover, be stopped at an intermediate stage in the succession of the above operations (a) to (d), especially when it is only required to enrich the raw material with rhenium.

It is known that the main impurity accompanying rhenium is molybdenum. The method according to the invention makes it possible to separate those elements during the above-mentioned operations because the respective extraction coefficients are very different in the determined solvent phases.

In the table below is reported the values of the extraction coefficients of rhenium and molybdenum when oxidized respectively to the heptavalent and hexavalent state. The solvent phase is isoamyl alcohol and an excess of hydrogen ions is provided through addition of sulphuric acid.

Values of the extraction coefficient:

| Concentration in sulphuric acid | Heptavalent rhenium | Hexavalent molybdenum |
|---|---|---|
| 3 N | 8 | $4 \times 10^{-2}$ |
| 6 N | approx. 26 | $7 \times 10^{-2}$ |

The table shows that the extraction coefficient of the hexavalent molybdenum increases with the concentration of the sulphuric acid solution like the extraction coefficient of the perrhenic acid. Nevertheless, the extraction coefficients of molybdenum remain low and, therefore, the excess of hydrogen ions added to the solution to be treated can be increased to improve the separation of the rhenium.

In order to make the invention clear, a detailed example of execution of the method applied to the extraction of rhenium from natural products in the form of solid dusts, pastes or solutions, containing some of it, will now be described; some examples of obtaining rhenium alkaline salts through the method according to the invention will then be described.

*Example 1.—(Extraction of rhenium)*

The rhenium is preliminarily brought to the highest valence (heptavalence corresponding to the most stable form of rhenium and its compounds) and put into an aqueous solution to which an excess of hydrogen ions is added, if necessary, through addition of a strongly ionized acid. To this purpose 50 cc. of hydrogen peroxide at 100 volumes are added to 4 liters of a solution containing:

|  | G. |
|---|---|
| Rhenium | 19.5 |
| Molybdenum | 100 |
| Iron | 60 |
| Sulphuric acid | 882 | in order to bring the rhenium with certainty to the highest valence, and the excess of hydrogen peroxide is eliminated.

The 4,050 liters of solution are then stirred with 4,050 liters of commercial amyl alcohol.

After decanting one obtains:

Solvent phase:
    Volume _____ cc __ 4,150
    Amount of rhenium _____ g __ 18.3
    Amount of sulphuric acid _____ g __ 61
Aqueous phase:
    Volume _____ cc __ 3,860
    Amount of rhenium _____ g __ 1.2
    Amount of sulphuric acid _____ g __ 821

The solvent phase contains 94% of the total rhenium in the form of perrhenic acid and 6.5% of the sulphuric acid, the coefficients of extraction being respectively equal to about 15 and $7 \times 10^{-2}$, which corresponds to the results transcribed on Diagrams 1 and 2.

In order to diminish the percentage of sulphuric acid in the solvent phase, the latter is washed with about 10% of water, that is to say 400 cc. of water, but this operation is not absolutely necessary.

After decanting one obtains:

Solvent phase:
    Volume _____ cc __ 4,150
    Amount of rhenium _____ g __ 17.94
    Amount of sulphuric acid _____ g __ 20
Wash water:
    Volume _____ cc __ 400
    Amount of rhenium _____ g __ 0.36
    Amount of sulphuric acid _____ g __ 41

A reduction of the amount of rhenium in the solvent phase of 0.36 g., i. e. about 2% is thus obtained, the reduction in the amount of sulphuric acid being of 41 g., i. e. about 66%. In this stage the solvent phase contains 92% of the initial rhenium.

In order to extract the rhenium from the solvent phase, the 4,150 cc. of the solvent phase are very energetically stirred with 3 liters of an ammonia solution titrating $1.4 \times 10^{-1}$ causing the complete neutralization of the acids in the form of ammonium salts during the course of operations. Said salts pass into the ammonia solution, the extraction coefficient being to the advantage of the latter.

As the equilibrium is slow to be established during this extraction, it is therefore often advantageous, without it being necessary, to perform a second extraction with one liter of water. Also the extraction can be operated at a temperature on the order of about 50° C., the solutions then being cooled before decanting.

After these different operations one obtains:

Solvent phase:
   Volume _____ cc___ 4,150
   Amount of rhenium _____ g___ 0.94
Aqueous phase:
   Volume _____ liters___ 4
   Amount of rhenium _____ g___ 17

At the end of the treatment, 87% of the initial rhenium is thus recovered in the form of ammonium perrhenate containing a small quantity of ammonium sulphate. The losses are set up as follows:

|  | weight of lost rhenium, g. | Percent |
| --- | --- | --- |
| First extraction | 1.2 | 6 |
| Washing of solvent with water | 0.36 | 1.8 |
| Second extraction | 0.94 | 4.8 |
| Total | 2.50 | 12.6 |

It is obvious that when the initial solution is exhausted through alcohol in an extracting battery, the final yield can exceed 95%.

There is a big advantage in extracting the rhenium from the solvent phase through an ammonia solution because the coefficient of ammonium perrhenate extraction is very low (see Fig. 3) and this salt is soluble enough in water (about 60 g. per liter).

*Example 2*

In order to obtain the various alkaline salts from rhenium, it is sufficient to replace the ammonia solution by an alkaline solution corresponding to the required salt. When potassium perrhenate is to be obtained, one first can proceed to the isolation of the ammonium perrhenate. To this purpose, a large excess of ammonium ions is added to the 4 liters of the final aqueous solution of Example 1. The solution is concentrated to precipitate the ammonium perrhenate which is purified through fractional crystallizations from water or from a mixture of ethyl alcohol and water. The residual solutions can be exhausted by the solvent for the total recuperation of the rhenium.

Sufficient potassium chloride is added to the 4 liters of solution of ammonium perrhenate so that the ammonium potassium ions can be replaced by ions.

The potassium perrhenate which is not very soluble, precipitates. It is thereafter purified through a series of fractional crystallizations as for the ammonium perrhenate.

In the present instance, 26.6 g. of raw potassium perrhenate containing 90% of a pure product are finally extracted. Finally, 16.5 g. of rhenium are recovered, that is a final yield of $$\frac{16.5}{19.5} = \text{about } 84\%$$

The potassium perrhenate contains about 10% of potassium sulphate. In order to partially reduce this last impurity, the solvent phase obtained in the first extraction is washed more thoroughly before extracting the perrhenic acid through an alkaline solution.

In these various operations, it is desirable to use an exhaustion battery. The increase in the number of elements makes it possible, in fact, to perform the extraction with a low extraction coefficient, and thus to reduce the quantity of sulphuric acid which is added to the initial solution.

Under the conditions of Example 1, the rhenium is obtained from its alkaline salts according to the standard methods, either through electrolysis, or reduction of the ammonium salt, preferably at 1000°, by hydrogen; the yield is quantitative.

The rhenium thus obtained according to Example 1 is very pure; the weight ratio $$\frac{\text{sulphur}}{\text{rhenium}}$$

is less than $10^{-4}$, the ratios $$\frac{\text{molybdenum}}{\text{rhenium}}$$

and $$\frac{\text{iron}}{\text{rhenium}}$$

also being less than $10^{-4}$.

The method of the invention gives a quantitatively extract ion of the heptavalent rhenium even when present only in traces. Curve 14 of Fig. 2 shows in effect that the extraction coefficient is the same for the low concentrations as for the high concentrations. The method also can give an enrichment of raw materials containing rhenium without totally isolating of the metal. To this purpose, and according to the present invention, one can operate according to one or the other of the following manners:

*Example 3*

After the quantitative extraction of rhenium by solvent according to the previous examples, the solvent phase is exhausted with a one-tenth volume of alkaline water. An aqueous solution with a ten fold increase in rhenium concentration than the initial solution is thus obtained.

*Example 4*

Either a part of the loaded solvent phase is distilled before performing the alkaline solution extraction or all of the solvent is distilled in order directly to obtain rhenium at high concentration. The distillation must be controlled to avoid any loss of rhenium.

In either case, if $F_{Mo}$ represents the extraction coefficient of the molybdenum with the acidity chosen for the extraction of the rhenium, the proportion of molybdenum accompanying the rhenium after extraction is $$\frac{1}{F_{Mo}}$$

times smaller than initially.

For the continuous or discontinuous working of the invention, any suitable equipment can be used, especially, a methodical extraction battery and an assembly of apparatus for the regeneration and recuperation of the products used (solvent and the acid generating hydrogen ions).

The recovery of the solvent phase presents no difficulty and can be carried out either continuously or discontinuously according to standard technics which consist in the following operations; water washing and distillation or rectification without it being necessary, before or after recovery, to separate the water dissolved therein.

Consequently, the solvent can be cycled, the total or partial regeneration enabling either the total elimination of the impurities or the maintaining at a constant level, the impurities which accumulate during the operations.

The recovery of the added acid is always possible, but this recovery depends on the extraction costs. Additionally the wash waters from the solvent phase containing the rhenium can also be recycled.

During the roasting operation of the molybdenites, the dusts carried away and containing the rhenium are caught; this recovery gives, in certain cases, pastes or solutions of perrhenic acid in sulphuric acid deriving from the oxidation of sulfur dioxide produced during the roasting phase. It is then possible to extract the rhenium directly without adding any additional sulphuric acid if the concentration of the latter is sufficient to effect the extraction under the best possible conditions. If the percentage of sulphuric acid is not sufficient, the additional amount to be added is relatively small, and does not justify, in practice, the recovery of this product.

The foregoing description and examples show that the method according to the present invention eliminates all disadvantages hitherto encountered in the extraction of rhenium according to the standard methods through precipitation in the form of potassium perrhenate from sulphuric pastes or solutions of perrhenic acid where the high concentration of sulphuric ions brought about the formation of perrhenate and potassium sulphate mixtures which were very difficult to separate so that the prior art operations were always very difficult.

Examples relative to the extraction of rhenium from molybdenites, irrespective of their concentration in said body, have been described above. The method according to this invention is not limited to such an extraction of rhenium. As it had already been mentioned, the method is applicable to the extraction and the purification of organic or mineral compounds behaving in a similar manner to rhenium with regard to the extraction, and in particular to heptavalent compounds of technetium. In a general manner, the compounds which are likely to be extracted according to the method in accordance with this invention must process at least one acid function practically completely free in an aqueous medium. The following can thus be extracted from an acid medium similar to perrhenic acid: picric, thiocyanic and perchloric acids which are ionized in an aqueous medium.

Without it being necessary to give more details one can, for example, extract according to the invention:

(1) Quantitatively picric acid in the presence of an excess of sulphuric acid through butyl and amyl alcohols;

(2) Perchloric acid through isoamyl alcohol in the presence of an excess of hydrogen ions (curve 19—Fig. 2);

(3) Thiocyanic acid, the extraction coefficient F of which, when extracted by isoamyl alcohol, is about 3 in a 1 normal perchloric acid medium.

Thiocyanic acid can also be extracted by taking into consideration that the extraction coefficient of this acid when extracted by methylisobutylketone is:

F, 4—for an acidity of 0.5 N of the aqueous phase at equilibrium
F, 9.2—for an acidity of 1.2 N of the aqueous phase at equilibrium
F, 30—for an acidity of 4 N of the aqueous phase at equilibrium (4) Quantitatively chloroplatinic acid by using methylisobutylketone in the presence of 4 N hydrochloric acid.

What I claim is:

1. The method of extracting an ionizable acid selected from the group consisting of picric acid, perrhenic acid, thiocyanic acid, perchloric acid, and chloroplatinic acid from an aqueous solution thereof, which comprises adding an excess of hydrogen ions to said solution and adding a substantially immiscible organic solvent selected from the group consisting of relatively water-insoluble alcohols and ketones to said acid solution, whereby substantially all of said ionizable acid is absorbed by said solvent.

2. The method of extracting an ionizable acid from an aqueous solution thereof as in claim 1, wherein said organic solvent is butanol.

3. The method of extracting an ionizable acid from an aqueous solution thereof as in claim 1 wherein said organic solvent is isoamyl alcohol.

4. The method of extracting an ionizable acid from an aqueous solution thereof as in claim 1, wherein said organic solvent is octyl alcohol.

5. The method of extracting an ionizable acid from an aqueous solution thereof as in claim 1, wherein said organic solvent is benzyl alcohol.

6. The method of extracing an ionizable acid from an aqueous solution thereof as in claim 1, wherein said solvent is methylisobutylketone.

7. The method of extracting rhenium from molybdenites containing rhenium derivatives, which comprises oxidizing the rhenium derivatives to perrhenates, dissolving said perrhenates in water, adding hydrogen ions to the aquous solution in excess of the amount required to transform said perrhenates into perrhenic acid, adding a substantially water-immiscible organic solvent selected from the group consisting of relatively water-insoluble alcohols and ketones to said acid solution, whereby said perrhenic acid passes from the aqueous phase to the solvent phase, separating the solvent phase from the aqueous phase, extracting the perrhenic acid from said solvent phase in the form of a perrhenic acid from said solvent phase in the form of a perrhenate, and transforming said perrhenate into elemental rhenium.

8. The method of extracting rhenium from molybdenites containing rhenium derivatives, which comprises oxiding the rhenium derivatives to perrhenates, dissolving said perrhenates in water, adding at least one highly ionized acid selected from the group consisting of sulfuric acid, hydrochloric acid, perchloric acid and perrhenic acid to said aqueous solution in an amount exceeding that which is necessary to convert said perrhenates into perrhenic acid, adding a substantially water-immiscible organic solvent selected from the group consisting of relatively water-insoluble alcohols and ketones to said acid solution, whereby the perrhenic acid passes from the aqueous phase to the solvent phase, separating the solvent phase from the aqueous phase, extracting the perrhenic acid from the solvent phase in the form of perrhenates by adding to said solvent phase an alkaline aqueous solution, and converting said perrhenates into elemental rhenium.

9. The method of extracting rhenium from molybdenites containing rhenium derivatives, which comprises oxidizing the rhenium derivatives to perrhenates, dissolving said perrhenates in water, adding sulfuric acid to said aqueous solution in an amount exceeding that which is necessary to convert said perrhenates into perrhenic acid, adding water-immiscible amyl alcohol to said acid solution, whereby the perrhenic acid passes from the aqueous phase to the alcohol phase, separating the alcohol phase from the aqueous phase, adding an aqueous ammonia solution to said alcohol phase, whereby the perrhenic acid is transformed into ammonium perrhenate and passes into solution in the aqueous ammonia phase, separating the aqueous ammonia phase from the alcohol phase, extracting the ammonium perrhenate from the aqueous ammonia solution and converting the ammonium perrhenate into elemental rhenium.

10. The method of extracting rhenium derivatives from molybdenites containing rhenium derivatives, which comprises oxidizing the rhenates to perrhenates, dissolving said perrhenates in water, adding sulfuric acid and perrhenic acid to said aqueous solution in an amount exceeding that which is necessary to convert said perrhenates into perrhenic acid, adding a substantially water-immiscible organic solvent selected from the group consisting of relatively water-insoluble alcohols and ketones to said acid solution, whereby the perrhenic acid passes from the aqueous phase to the solvent phase, separating the solvent phase from the aqueous phase, extracting the perrhenic acid from the solvent phase in the form of perrhenates by adding to said solvent phase an alkaline aqueous solution, and converting said perrhenates into elemental rhenium.

11. The method of extracting rhenium from molybdenites containing rhenium derivatives, which comprises oxidizing the rhenium derivatives to perrhenates, dissolving said perrhenates in water, adding perrhenic acid to said aqueous solution in an amount exceeding that which is necessary to convert said perrhenates into perrhenic acid, adding a substantially water-immiscible organic solvent selected from the group consisting of relatively water-insoluble alcohols and ketones to said acid solution, whereby the perrhenic acid passes from the aqueous phase to the solvent phase, separating the solvent phase from the aqueous phase, extracting the perrhenic acid from the solvent phase in the form of perrhenates by adding to said solvent phase an alkaline aqueous solution, and converting said perrhenates into elemental rhenium.

12. The method of extracting rhenium from molybdenites containing rhenium derivatives, which comprises oxidizing the rhenium derivatives to perrhenates, dissolving said perrhenates in water, adding at least one highly ionized acid selected from the group consisting of sulfuric acid, hydrochloric acid, perchloric acid and perrhenic acid to said aqueous solution in an amount exceeding that which is required to convert perrhenates into perrhenic acid, adding a substantially water-immiscible organic solvent selected from the group consisting of relatively water-insoluble alcohols and ketones to said acid solution, whereby the perrhenic acid passes from the aqueous phase to the solvent phase, separating the solvent phase from the aqueous phase, adding an alkaline aqueous solution to said solvent phase, whereby said perrhenic acid passes from said solvent phase to said alkaline aqueous solution, separating said perrhenic acid from the alkaline aqueous solution and converting said perrhenic acid into elemental rhenium.

13. The method of extracting rhenium from molybdenites containing rhenium derivatives, which comprises oxidizing the rhenium derivatives to perrhenates, dissolving said perrhenates in water, adding at least one highly ionized acid selected from the group consisting of sulfuric acid, hydrochloric acid, perchloric acid and perrhenic acid to said aqueous solution in an amount exceeding that which is required to convert said perrhenates into perrhenic acid, adding a substantially water-immiscible organic solvent selected from the group consisting of relatively water-insoluble alcohols and ketones to said acid solution, whereby the perrhenic acid passes from the aqueous phase to the solvent phase, separating the solvent phase from the aqueous phase, adding water to said solvent phase, separating the solvent phase from the aqueous phase, adding an aqueous alkaline solution to said solvent phase containing perrhenic acid whereby said perrhenic acid passes from said solvent phase to said alkaline aqueous solution, separating said perrhenic acid from the alkaline aqueous solution and converting said perrhenic acid into elemental rhenium.

14. The method of extracting rhenium from molybdenites containing rhenium derivatives, which comprises oxidizing the rhenium derivatives to perrhenates, dissolving said perrhenates in water, adding sulfuric acid to said aqueous solution in an amount exceeding that which is necessary to convert said perrhenates into perrhenic acid, adding water-immiscible amyl alcohol to said acid solution, whereby the perrhenic acid passes from the aqueous phase to the alcohol phase, separating the alcohol phase from the aqueous phase, adding water to said alcohol phase, whereby the perrhenic acid passes from the alcohol phase to the aqueous phase, separating the perrhenic acid from the aqueous phase and converting the perrhenic acid into elemental rhenium.

References Cited in the file of this patent

UNITED STATES PATENTS

| | | |
|---|---|---|
| 1,987,278 | Wilson | Jan. 8, 1935 |
| 2,148,460 | Haney | Feb. 28, 1939 |
| 2,176,899 | Gordon et al. | Oct. 24, 1939 |
| 2,211,119 | Hixson et al. | Aug. 13, 1940 |
| 2,250,976 | Van Dijck | July 29, 1941 |
| 2,392,047 | Kassel | Jan. 1, 1946 |
| 2,564,241 | Warf | Aug. 13, 1951 |

OTHER REFERENCES

Comprehensive Treatise on Inorganic and Theoretical Chemistry by Mellon, vol. 12, published 1932 by Longmans, Green and Co., N. Y., pp. 474.

Chemical Engineer's Handbook, by Perry, 3rd ed., published 1950 by McGraw-Hill Book Co., Inc., pp. 714–718.

UNITED STATES PATENT OFFICE
CERTIFICATE OF CORRECTION

Patent No. 2,855,294                                                   October 7, 1958

Suzanne Tribalat

It is hereby certified that error appears in the printed specification of the above numbered patent requiring correction and that the said Letters Patent should read as corrected below.

Column 2, line 13, for "its" read -- it --; line 64, for "generating" read -- regenerating --; column 8, line 30, strike out "phase in the form of a perrhenic acid from said solvent"; line 35, for "oxiding" read -- oxidizing --.

Signed and sealed this 29th day of March 1960.

(SEAL)
Attest:

KARL H. AXLINE                                                       ROBERT C. WATSON
Attesting Officer                                             Commissioner of Patents

UNITED STATES PATENT OFFICE
CERTIFICATE OF CORRECTION

Patent No. 2,855,294                                                  October 7, 1958

Suzanne Tribalat

It is hereby certified that error appears in the printed specification of the above numbered patent requiring correction and that the said Letters Patent should read as corrected below.

Column 2, line 13, for "its" read -- it --; line 64, for "generating" read -- regenerating --; column 8, line 30, strike out "phase in the form of a perrhenic acid from said solvent"; line 35, for "oxiding" read -- oxidizing --.

Signed and sealed this 29th day of March 1960.

(SEAL)
Attest:

KARL H. AXLINE                                               ROBERT C. WATSON
Attesting Officer                                            Commissioner of Patents